United States Patent [19]

Sasaki et al.

[11] Patent Number: 5,496,652
[45] Date of Patent: Mar. 5, 1996

[54] ZINC-PLATED STEEL PLATE HAVING RESIN COATING FILM

[75] Inventors: Kenichi Sasaki; Toshiyuki Okuma; Masaaki Yamashita; Toyofumi Watanabe, all of Tokyo, Japan

[73] Assignee: NKK Corporation, Tokyo, Japan

[21] Appl. No.: 53,876

[22] Filed: Apr. 27, 1993

[30] Foreign Application Priority Data

Apr. 30, 1992 [JP] Japan ................. 4-111890

[51] Int. Cl.$^6$ .................................. B32B 15/08
[52] U.S. Cl. .................. 428/623; 428/626; 428/659
[58] Field of Search .................. 428/623, 626, 428/622, 658, 666, 461, 659

[56] References Cited

U.S. PATENT DOCUMENTS

| | | | |
|---|---|---|---|
| 3,836,494 | 9/1974 | Hekal et al. | 268/29.44 |
| 3,908,066 | 9/1975 | Parkinson | 428/379 |
| 4,225,650 | 9/1980 | vanBrederode et al. | |
| 4,345,004 | 8/1982 | Miyata et al. | 428/416 |
| 4,407,893 | 10/1983 | Malizio | 428/454 |
| 4,440,908 | 5/1984 | McClain | 525/196 |
| 4,693,909 | 9/1987 | Ziegler et al. | |
| 4,889,775 | 12/1989 | Adaniya et al. | 428/62 B |
| 4,948,678 | 8/1990 | Shindou et al. | 428/623 |
| 4,970,126 | 11/1990 | Adaniya et al. | |
| 5,139,760 | 8/1992 | Ogawa et al. | 428/328 |
| 5,160,788 | 11/1992 | Feinberg | 428/344 |

FOREIGN PATENT DOCUMENTS

| | | |
|---|---|---|
| 0201702 | 11/1986 | European Pat. Off. . |
| 0282073 | 9/1988 | European Pat. Off. . |
| 2647700 | 4/1977 | Germany . |
| 60-63385 | 4/1985 | Japan . |
| 60-77988 | 5/1985 | Japan . |
| 63-250496 | 10/1988 | Japan . |
| 3-81145 | 8/1989 | Japan . |
| 2-8374 | 1/1990 | Japan . |

OTHER PUBLICATIONS

Roff, W. J. and Scott, J. R. *Handbook of Common Polymers*, CRC Press, 1971, pp. 3 and 8.

*Primary Examiner*—Michael Lewis
*Assistant Examiner*—Linda L. Gray
*Attorney, Agent, or Firm*—Frishauf, Holtz, Goodman, Langer & Chick

[57] ABSTRACT

A zinc-plated steel sheet having a resin coating film formed on the surface is obtained by forming a chromate treating layer on the surface of a base steel sheet plated with zinc or a zinc alloy, said chromate treating layer being deposited in an amount of 1 to 200 mg/m$^2$ in terms of metal chromium, followed by forming a resin coating film on the chromate treating layer in a thickness of 0.1 to 5 μm, said resin coating film being based on a composite resin material including a resin composition and at most 50% by weight of silica, said resin composition containing an ethylene-based ionomer resin and a silane compound having in the molecule a single silicon atom and 2 to 4 silyl ether bonds and/or its condensate.

20 Claims, No Drawings

ZINC-PLATED STEEL PLATE HAVING RESIN COATING FILM

Background of the Invention

1. Field of the Invention

The present invention relates to a zinc-plated steel sheet having a resin coating film formed on the surface of a zinc-based plating film with a chromate treating layer interposed therebetween. The zinc-plated steel sheet having such a resin coating film is widely used in household electric appliances or as construction materials.

2. Description of the Related Art

A steel sheet plated with zinc or a zinc alloy, hereinafter referred to as a zinc-plated steel sheet, exhibits an excellent corrosion resistance and, thus, is widely used in various industrial fields. When it comes to, particularly, household electric appliances, the members of the electric appliances, which were coated in advance in the past, tend to be used without painting treatment nowadays. Because of the particular tendency, the zinc-plated steel sheet without painting is required to exhibit a high resistance to corrosion and a satisfactory outer appearance.

Concerning the corrosion resistance, it is proposed to apply a corrosion resistant chromate treatment in place of the usual chromate treatment generally employed as a primary rust proof treatment. In the corrosion resistant chromate treatment noted above, the white rust generation time of about 100 hours can be achieved in the saline solution spray test and, thus, the requirement for a high corrosion resistance is satisfied to some extent. However, where the zinc-plated steel sheet subjected to the corrosion resistant chromate treatment, which has not received a painting, is preserved under, particularly, the humid environment of a high temperature, the surface of the zinc-plated steel sheet is partially or entirely blackened with time. Naturally, the blackening markedly impairs the commercial value of the zinc-plated steel sheet.

The blackening is considered to denote an initial stage of the corrosion phenomenon. To be more specific, water or oxygen is considered to permeate through the chromate treating film during preservation of the zinc-plated steel sheet to reach the surface of the plating layer so as to form an oxide, a hydroxide, a hydrated oxide, etc. on the surface of the plating layer. These oxide, etc. are considered to absorb and scatter the visible light, leading to the blackening phenomenon. It should be noted that traces of lead, aluminum, etc. present in the zinc plating layer allow zinc to act as an anode so as to bring about the above-noted reactions to form the oxide, etc. It should also be noted that foreign matters or impurities, e.g., components of the plating bath such as $SO_4^{2-}$ and $Cl^-$, impurity ions in the chromate bath, and oil components, are nonuniformly attached to the surface of the plating layer so as to further promote the reactions noted above.

In view of the situation described above, various measures are proposed in an attempt to enable the zinc-plated steel sheet to exhibit an improved resistance to the blackening phenomenon. For example, it is proposed to control accurately the impurity concentration in the plating bath. It is also proposed to apply the washing treatment more carefully after the plating treatment. However, it is impossible to suppress the blackening phenomenon satisfactorily.

Under the circumstances, some techniques are being proposed as summarized below in an attempt to suppress the blackening phenomenon in view of the plating or chromate treatment.

First of all, it is disclosed in Published Unexamined Japanese Patent Application No. 60-63385, hereinafter referred to as prior art 1, that the concentration of an impurity $Pb^{2+}$ in the zinc plating bath is controlled at a level of 0.2 ppm or less so as to achieve a zinc crystal orientation of (002) plane of zinc, which is chemically stable, is preferentially precipitated. It is taught that the particular crystal orientation permits suppressing the reaction between zinc and the chromate treating layer so as to suppress the blackening phenomenon.

It is also disclosed in Published Unexamined Japanese Patent Application No. 60-77988, hereinafter referred to as prior art 2, that the zinc plating bath is controlled to provide a $Ni^{2+}/Pb^{2+0}$ ratio of 5 to 500, a $Ni^{2+}/Zn^{2+}$ ratio of 1/25 or less and a $Ni^{2+}$ concentration of 10 g/liter or less. It is taught that the (002) plane of zinc, which is stable even in the presence of $Pb^{2+}$ is preferentially precipitated within the zinc plating bath specified above.

It is also disclosed in Published Unexamined Japanese Patent Application No. 63-250496, hereinafter referred to as prior art 3, that the zinc-plated steel sheet which is applied an electrolytic type chromate treatment using a zinc plating bath containing 30 to 60% of [Ni] component defined as $[Ni]/([Ni]+[Cr]+[O]) \times 100$.

Further, it is disclosed in Published Unexamined Japanese Patent Application No. 2-8374, hereinafter referred to as prior art 4, that a plating bath is controlled to provide not more than 0.5 ppm of $Pb^{2+}$, 100 to 300 ppm of $Ni^{2+}$, and a $Ni^{2+}/Pb^{2+}$ ratio exceeding 500. It is taught that a dried-in-place type chromate treatment containing silica sol, etc. is applied to the plating layer formed under the conditions given above.

In the prior arts exemplified above, however, serious problems remain unsolved. Specifically, the techniques of prior arts 1 and 2 certainly permit stabilizing the plating layer so as to suppress the nonuniformity in the reaction type chromate treatment. However, the steel sheet manufactured by these techniques is incapable of sufficiently suppressing the blackening problem under a severe corrosive environment, i.e., under an atmosphere of a high temperature and a high humidity.

Prior arts 3 and 4 are intended to improve the chromate treatment or both the plating layer and the chromate treatment so as to suppress the blackening phenomenon. In these prior arts, the blackening phenomenon can be suppressed to some extent in the case where the steel sheet is preserved under relatively mild conditions. However, the blackening phenomenon cannot be suppressed sufficiently under severe preserving conditions. In conclusion, the technique of each of prior arts 3 and 4 fails to meet simultaneously the requirement for the resistance to the blackening phenomenon and to the color fading accompanying the chromium elution and the requirement for the resistance to the corrosion. What should also be noted is that the steel sheet manufactured by the technique disclosed in these prior arts tends to be scratched by the handling in the step of, for example, the slit processing or transference. It is unavoidable for the scratched portion to be corroded.

A zinc-plated steel sheet having a resin layer formed on a chromate treating layer has also been developed. However, the steel sheet of this type is not intended to suppress the blackening phenomenon on the surface. As a matter of fact, the steel sheet of this type is poor in its resistance to the blackening problem.

SUMMARY OF THE INVENTION

An object of the present invention is to provide a zinc-plated steel sheet having a resin coating film formed on the surface, said steel sheet exhibiting a high corrosion resistance, a high resistance to the blackening problem, and being unlikely to be scratched.

According to the present invention, there is provided a zinc-plated steel sheet having a resin coating film formed on the surface, comprising:

a base steel sheet plated with zinc or a zinc alloy;

a chromate treating layer formed on the plating layer of said base steel sheet, said chromate treating layer being deposited in an amount of 1 to 200 mg/m$^2$ in terms of metal chromium; and a resin coating film formed on the chromate treating layer in a thickness of 0.1 to 5 μm, said resin coating film being based on a composite resin material including a resin composition and at most 50% by weight of silica, said resin composition containing an ethylene-based ionomer resin and a silane compound having in the molecule a single silicon atom and 2 to 4 silyl ether bonds and/or its condensate.

It is possible for the composite resin material used in the present invention to contain not more than 50% by weight of a chromium compound in place of silica. It is also possible for the composite resin material to contain not more than 50% by weight of both a chromium compound and silica.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

As a result of an extensive research made in an attempt to solve the above-noted problems inherent in the conventional zinc-plated steel sheet, the present inventors have found it possible to provide a steel sheet which exhibits high resistances to corrosion and to the blackening problem and which permits suppressing the scratch occurrence or the like by forming a chromate treating layer on the plating layer of a zinc-plated steel sheet, followed by forming a special resin layer on the chromate treating layer. To be more specific, the present inventors have found that it is highly advantageous to form, on a chromate treating layer having a predetermined thickness, a resin coating film in a predetermined thickness, said resin coating film being based on a composite resin material including a resin composition and at most 50% by weight of silica and/or chromium compound, said resin composition containing an ethylene-based ionomer resin and a silane compound having in the molecule a single silicon atom and 2 to 4 silyl ether bonds and/or its condensate. It has been found that a barrier effect is produced by the particular molecular structure of the compounds contained in resin coating film so as to improve the resistances of the steel sheet to the blackening phenomenon and to the scratches, keeping high resistance to corrosion. The present invention has been achieved on the basis of the findings.

The zinc-plated steel sheet of the present invention comprises a base steel sheet plated with zinc or a zinc based alloy, a chromate treating layer formed on the plating layer of the base steel sheet, and a resin coating film formed on the chromate treating layer, said resin coating film being based a composite resin material.

The base steel sheet used in the present invention is not particularly restricted as far as the steel sheet is applied with zinc based plating. For example, it is possible to use a steel sheet widely used in this technical field, i.e., a steel sheet plated with pure zinc or a zinc alloy by the electroplating or hot dipping. However, it is particularly effective to apply the technical idea of the present invention to a pure zinc-plated steel sheet plated by the electroplating because the blackening phenomenon in question is most likely to take place in the steel sheet of this type.

The chromate treating layer can be formed by the ordinary method. For example, it is possible to employ the known chromate treating methods of reaction type, dried-in-place type and electrolytic type. The deposition amount of the chromate treating layer should be 1 to 200 mg/m$^2$ in terms of the metal chromium. If the deposition amount defined in this fashion is smaller than 1 mg/m$^2$, it is impossible to obtain a sufficiently high corrosion resistance. If the deposition amount exceeds 200 mg/m$^2$, however, the improvement in the corrosion resistance is not increased in proportion to the deposition amount. In addition, a cohesive failure is likely to take place in the chromate treating layer in the case where, for example, a bending treatment which accompanies deformation of the steel sheet is applied to the treated steel sheet. Preferably, the deposition amount of the chromate treating layer falls within a range of between 10 and 100 mg/m$^2$ in terms of the metal chromium.

To be more specific, it is desirable to use, for example, a reaction type chromate treating solution containing as main components a water-soluble chromium compound in an amount of 1 to 100 g/liter in terms of the metal chromium and 0.2 to 20 g/liter of sulfuric acid. In this case, the amount of trivalent chromium should be not larger than 50% by weight based on the total amount of chromium. Preferably, the amount of trivalent chromium is not larger than 20–35% by weight based on the total amount of chromium. Further, it is possible to add to the reaction type chromate treating solution a suitable amount of a metal ion such as $Zn^{2+}$, $Co^{2+}$ or $Fe^{3+}$ and another mineral acid such as phosphoric acid or hydrofluoric acid.

On the other hand, a dried-in-place type chromate treating solution can be prepared by, for example, adding an organic resin phase to a solution substantially equal in composition to the reaction type chromate treating solution described above so as to control the pH value to fall within a range of between 2.0 and 3.5. The resin noted above should be soluble in water and should contain a large amount of carboxyl groups in the molecule. Further, the resin should be compatible with the solution substantially equal in composition to the reaction type chromate treating solution. It is desirable for the organic resin to have an average molecular weight of 1,000 to 500,000. Generally, the amount of the organic resin in the solution 0.02 to 30 g/liter in terms of the resin.

In the case of using any types of chromate treating, the deposition amount of the chromate treating layer is acceptable as far as the amount falls within a range of between 1 and 200 mg/m$^2$ in terms of the metal chromium, as described previously.

The resin coating film formed on the chromate treating layer is based on a composite resin material comprising a resin composition and silica in an amount not larger than 50% by weight, said resin composition containing an ethylene-based ionomer resin and a silane compound having a single silicon atom and 2 to 4 silyl ether bonds in the molecule and/or its condensate. When dried, the coating film based on the composite resin material described above is strongly bonded to the underneath layer and is chemically stable. It follows that the steel sheet covered with the particular resin coating film exhibits excellent resistances to the blackening phenomenon and to corrosion. Further, since the resin coating film is strongly formed on to the steel sheet, the steel sheet is unlikely to be scratched.

The ethylene-based ionomer resin used as a main component of the composite resin material is a high molecular material obtained by neutralizing the carboxyl group of a copolymer with a specified ion or an ionic compound, said copolymer having ethylene units containing 3 to 20 mol % of α, β-ethylenically unsaturated carboxylic acid, α, β-ethylenically unsaturated carboxylic acid units and, as desired, another monomer unit.

The α, β-ethylenically unsaturated carboxylic acid noted above includes, for example, acrylic acid, methacrylic acid, fumaric acid, itaconic acid, and maleic acid. On the other hand, said monomer which is used as desired includes, for example, α, β-ethylenically unsaturated carboxylic acid esters such as methyl acrylate, and methyl methacrylate; and vinyl esters such as vinyl acetate. The molecular weight of the copolymer, which is not particularly restricted in the present invention, falls in generally within a range of between 10,000 and 200,000 in terms of the weight average molecular weight, preferably between 50,000 and 150,000. Further, the ion or ionic compound used for the neutralization includes, for example, hydroxides of metals such as an alkali metal, an alkaline earth metal and a transition metal, organic amines, and complexes between an organic amine and a transition metal.

It should be noted that, if the amount of the α, β-ethylenically unsaturated carboxylic acid contained in ethylene exceeds 20 mol %, the solubility in water is rendered unduly high, with the result that the resin coating film is rendered low in its resistances to the blackening phenomenon and to the corrosion. On the other hand, if the amount noted above is smaller than 3 mol %, the bonding strength between the resin coating film and the base steel sheet is lowered, resulting in failure to form a satisfactory resin coating film.

The ionomer resin used in the present invention has an ionically crosslinked structure in which a specified ion or an ionic compound acts as a crosslinking agent. Because of the particular chemical structure, the ionomer resin can be used for readily forming a water dispersion type coating solution. Of course, a thin coating film can be formed easily on the surface of a steel sheet by using the water dispersion type coating solution noted above. It should also be noted that, when dried to form a coating film, the ionomer resin is strongly bonded to the steel sheet. In addition, the ionomer resin in the coating film is chemically stable. It follows that the steel sheet having the resin coating film formed on the surface exhibits excellent resistances to the blackening phenomenon and to corrosion. What should also be noted is that, since the ionomer resin specified in the present invention forms a strong film, the resin-coated steel sheet is unlikely to be scratched.

A reaction is carried out between the ethylene-based ionomer resin described above and a silane compound having a single silicon atom and 2 to 4 silyl ether bonds in the molecule. The particular silane compound is a silane compound having 2 to 4 alkoxy groups, allyloxy groups or aryloxy groups attached to a single silicon atom in the molecule. Use of the particular silane compound or a condensate thereof (hereinafter referred to as a reactive silane) permits further improving the corrosion resistance of the steel sheet.

The reactive silane used in the present invention includes, for example, a tetra-alkyl ortho silicate, a tetra-aryl ortho silicate, or a tetra-allyl ortho silicate represented by general formula (1) given below:

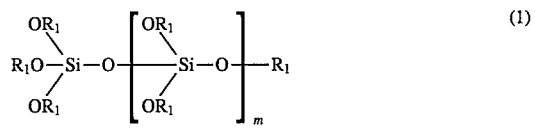

where $R_1$ is a $C_1$–$C_8$ alkyl group, an aryl group or an allyl group, which may have an alkoxy group, and m is an integer of 0 to 11. It is also possible to use polysilicates, which are condensates of the ortho silicates described above. To be more specific, the ortho silicates used in the present invention include, for example, methyl ortho silicate, ethyl ortho silicate, n-propyl ortho silicate, n-butyl ortho silicate, n-octyl ortho silicate, phenyl ortho silicate, benzyl ortho silicate, phenetyl ortho silicate, allyl ortho silicate and methallyl ortho silicate. Further, it is also possible to use polysilicates formed by dehydrating condensation of these ortho silicates, as described previously.

The reactive silane used in the present invention also includes silane compounds represented by general formula (2) given below:

$$(R_2)_{3-n}\text{—Si—}(OR_1)_{n+1} \qquad \ldots (2)$$

where $R_1$ is equal to that defined in general formula (1), $R_2$ is alkyl group, aryl group, allyl group or vinyl group, which may or may not be substituted and has 1 to 8 carbon atoms; and n is 1 or 2. The alkyl group represented by $R_2$ includes, for example, a methyl group, an ethyl group, a γ-chloropropyl group, γ-aminopropyl group, γ-(2-aminoethyl)aminopropyl group, γ-glycidoxy propyl group, β-(3, 4-epoxy cyclohexyl)ethyl group, and γ-methacryloyl oxypropyl group.

To be more specific, the silane compound used in the present invention includes, for example, divinyl ethoxy silane, divinyl-β-methoxy ethoxy silane, di(γ-glycidoxy propyl)dimethoxy silane, methyl triethoxy silane, vinyl triethoxy silane, vinyl tris-β-methoxy ethoxy silane, γ-glycidoxy propyl trimethoxy silane, γ-mechacryloyloxy propyl trimethoxy silane, β-(3,4-epoxy cyclohexyl)ethyl trimethoxy silane, and γ-mercaptopropyl trimethoxy silane. What should be noted is that any kind of reactive silane can be used in the present invention as far as the hydrolyzable group forming an ether bond to the silicon atom, e.g., hydrolyzable group such as an alkoxy group, in the reactive silane is hydrolyzed under specified conditions to form a silanol group and an alcohol.

The composite resin material used for forming the resin coating film contains not more than 50% by weight of silica. The presence of silica permits improving mainly the corrosion resistance of the steel sheet. very fine amorphous silica powdery particles having a primary particle diameter of 5 to 50 nm and a secondary particle diameter not larger than 500 nm can be used suitably in the present invention. The silica particles of this type, which has a silanol group on the particle surface, can be classified into, for example, three kinds described below depending on the type of supply to the market. Any of these three kinds of silica particles can be used in the present invention.

(1) Silica Fine Powder

The silica fine powder, which is generally called a dry silica, has a primary particle diameter of 5 to 50 nm and can be manufactured by burning silicon tetrachloride. The silica fine powder is used in the form of any of a dispersion in water or a dispersion in an organic solvent.

(2) Silica Dispersion in Organic Solvent

A silica dispersion in an organic solvent, which is a so-called organo silica sol, can be prepared by dispersing silica in an organic solvent by the method described in, for example, U.S. Pat. No. 2,285,449. To be more specific, the silica dispersion in an organic solvent is a silica sol which is prepared by substituting an organic solvent for water in a colloidal silica aqueous dispersion. It is particularly desirable in the present invention to use alcohols such as methanol, isopropanol and butyl cellosolve as the dispersion medium in the silica sol.

(3) Water Dispersion type Silica

A water dispersion type silica used in the present invention is a so-called colloidal silica, which can be manufactured by removing sodium from water glass by, for example, an ion exchange method, an acid decomposition method or a defocculating method. The silica particles of this type have a primary particle diameter of 5 to 50 nm. In general, the silica particles of this type is used in the form of a water dispersion.

The mixing ratio of silica to the ethylene-based ionomer resin is not particularly restricted in the present invention. However, in view of the corrosion resistance and the flexibility of the resin coating film, it is desirable to set the mixing ratio of silica to the ionomer resin to fall within a range of between 5/95 and 50/50 in terms of the weight of the solid components. More preferably, the ratio falls within a range of between 20/80 and 40/60.

In view of the effect of promoting the reaction and the stability of the system, it is desirable to use the reactive silane in an amount of 0.5 to 15 parts by weight relative to 100 parts by weight of the sum of silica and the ethylene-based ionomer resin in terms of the solid components. More preferably, the reactive silane is used in an amount of 1 to 10 parts by weight.

How to manufacture the composite resin material is not particularly restricted in the present invention. In general, the composite resin material is prepared as follows. In the first step, an ethylene-based ionomer resin is dissolved or dispersed in an hydrophilic solvent such as an alcohol solvent or a water-based solvent such that the resultant solution or dispersion contains solid components in an amount not larger than 40% by weight, followed by adding silica particles and the reactive silane to the solution or dispersion while stirring the solution or dispersion. Then, a basic hydrolyzing catalyst (such as a metal hydroxide, ammonia or an amine) or water is added, as required to the resultant system so as to bring about desired reactions.

In preparing the composite resin material used in the present invention, it is absolutely necessary to form silanol groups by hydrolyzing the reactive silane. To be more specific, the mixed liquid system should be heated to temperatures falling within a range of between 10° C. and the boiling point of the solvent of the system so as to carry out the hydrolyzing reaction and the condensation reaction and, thus, to obtain a desired composite resin material. In order to obtain a resin coating film having a high mechanical strength, it is desirable to heat continuously the mixed liquid system to temperatures falling within a range of between 50° C. and the boiling point of the solvent of the system including water. To be more specific, the mixed liquid system is heated to 50° to 90° C. so as to achieve a sufficient bonding between the two components of the mixed system.

In the present invention, it is possible to use 10 chromium compounds such as chromate compounds in place of silica contained in the composite resin material. In this case, the chromium compounds should be used in an amount not larger than 50% by weight. It is also possible to use silica and a chromium compound. In this case, the total amount of the silica and the chromium compound should not exceed 50% by weight. In the case of using a chromium compound singly or in combination with silica, the corrosion resistance of the steel sheet can be improved as in the case of using silica alone.

The chromium compound used in the present invention includes, for example, (1) hexavalent chromium compounds such as anhydrous chromic acid ($CrO_3$), lithium chromate ($Li_2CrO_4.2H_2O$), sodium chromate ($Na_2CrO_4.10H_2O$), potassium chromate ($K_2CrO_4$), ammonium chromate (($NH_4)_2CrO_4$), sodium bichromate ($Na_2Cr_2O_7.2H_2O$), potassium bichromate ($K_2Cr_2O_7$), ammonium bichromate (($NH_4)_2Cr_2O_7$), strontium chromate ($SrCrO_4$), barium chromate ($BaCrO_4$), lead chromate ($PbCrO_4$), calcium chromate ($CaCrO_4$), basic zinc chromate ($ZnCrO_4.4Zn(OH)_2$), basic potassium zinc chromate ($K_2O.4ZnO.4CrO_3.3H_2O$), and red silicochromate ($SiO_2.PbCrO_4$).

The chromium compound used in the present invention also includes, for example, (2) chromium chromate compound, which is a complex compound constituted by a hexavalent chromium compound and a trivalent chromium compound. A method of manufacturing such a complex compound is not particularly restricted in the present invention. For example, the complex compound can be obtained by reducing a hexavalent chromium compound with a compound which does not form a residual compound resulting from decomposition by the oxidation. The reducing agent meeting the particular requirement includes, for example, a monohydric alcohols such as methanol and ethanol; polyhydric alcohols such as sorbitol, ethylene glycol, and glycerin; aromatic polyhydric alcohols such as hydroquinone, and catechol; sugars such as starch, saccharide, and glucose; aldehydes such as formalin; and inorganic compounds such as hydrogen peroxide and hydrazine. The amount of the reducing agent is stoichiometrically determined as desired depending on the required amount of the hexavalent chromium within the chromium chromate compound. The reducing reaction using the reducing agent exemplified above is carried out under heating.

The mixing amount of the chromium compound used in the present invention should be not more than 50% by weight based on the amount of the resin coating film containing as a base material the composite resin material described previously. Preferably, the mixing amount noted above is not more than 30% by weight. If the mixing amount of the chromium compound exceeds 50% by weight, the resin coating film is rendered poor in its resistance to water. In this case, blisters tend to be brought about. Also, hexavalent chromium is likely to elute.

In the present invention, it is also possible to add a lubricity imparting agent to the composite resin material so as to impart lubricity to the resin coating film. It is desirable to use a material having a melting point of at least 70° C.

such as a polyolefin wax as the lubricity imparting agent. Any kind of the polyolefin wax can be used as the lubricity imparting agent as far as the polyolefin wax consists of polymers of olefinic hydrocarbons such as polyethylene, polypropylene, and polybutene. It is also possible for the polyolefin wax to consist of a plurality of the polyolefins exemplified above. The polyolefin wax having a melting point of at least 70° C. has in general a weight average molecular weight of about 500 to 20,000. Further, a fluorine resin such as a polyethylene tetrafluoride resin, a polypropylene hexafluoride resin or a polyvinylidene fluoride resin can also be used in combination with the polyolefin wax described above.

It is desirable to add the lubricity imparting agent in an amount not larger than 30% by weight based on the amount of the resin coating film containing the composite resin material. If the amount of the lubricity imparting agent exceeds 30% by weight, the mechanical strength of the resin coating film tends to 10 be lowered.

It is also possible to add a conductive material to the composite resin material so as to impart an electrical conductivity to the composite resin material and, thus, to improve the electrical weldability, electrophoretic deposition property and the earth ground property of the resin coating film. The conductive material used in the present invention includes, for example, powders of metals such as zinc, aluminum, iron, cobalt, nickel, manganese, chromium, molybdenum, tungsten, copper, lead, tin, and powders of alloys of these metals. It is also possible to use semiconductor oxides such as aluminum-doped zinc oxide powder, tin oxide-titanium oxide, tin oxide-barium sulfate, and nickel oxide-alumina.

Further, it is possible to add to the composite resin material chelate compounds of, for example, titanium, zirconium and aluminum, as described in Published Examined Japanese Patent Application No. 55-41711, and oxyacid salts, metal salts, etc. as described in Published Examined Japanese Patent Application No. 57-30867 and Published Examined Japanese Patent Application No. 55-62971 so as to improve the curability of the composite resin material.

Still further, pigments or dyes which are generally used in the field of coating materials can be dispersed in the composite resin material so as to form a colored resin coating film.

In the present invention, the resin coating film containing a composite resin material as a base material should be formed in a thickness falling within a range of between 0.1 and 5 µm, preferably between 0.3 and 3 µm. If the resin coating film is thinner than 0.1 µm, it is difficult to obtain a sufficient barrier effect in respect of the blackening phenomenon taking place on the surface of the steel sheet. In addition, the resin coating film is incapable of preventing the steel sheet from being scratched during handling of the steel sheet. On the other hand, if the resin coating film is thicker than 5 µm, the resin coating film is likely to peel off the steel sheet when the steel sheet is subjected to severe work.

The resin coating film can be formed, for example, as follows. In the first step, the surface of a steel sheet is coated with a liquid coating material which is based on the composite resin material by the known coating method using, for example, a roll coater, a curtain flow coater or a sprayer. Alternatively, it is possible to dip a zinc-plated steel sheet in the liquid coating material noted above, followed by controlling the deposition amount of the coating material by rolling or air blowing and subsequently drying the coated film. It is certainly possible to perform the drying at room temperature. However, the steel sheet is heated in general to at least 60° C., preferably to 80° to 200° C., by a hot air furnace or an induction heating apparatus.

EXAMPLES

Let us describe some Examples of the present invention together with Comparative Examples. Incidentally, the expressions "part" and "%" included in the following description are based on weight.

Synthetic Example 1 of Composite Resin Material 277 parts of Chemipar S-100 (trade name of a water dispersion of an ethylene-based ionomer resin manufactured by Mitsui Petrochemical Industry Co., Ltd., said dispersion containing 27% of solid components) was charged in a flask, followed by dripping 125 parts of Snowrex N (trade name of a colloidal silica manufactured by Nissan Kagaku Kogyo K.K., said colloidal silica containing 20% of solid components) into the flask over a period of about 10 minutes while sufficiently stirring Chemipar S-100 noted above at room temperature. After completion of the dripping, 2.0 parts of KBM 503 (trade name of γ-methacryloyloxy propyl trimethoxy silane manufactured by Shinetsu Kagaku Kogyo K.K.) was dripped into the flask, followed by heating the resultant reaction system to 85° C. The reaction system was maintained at 85° C. for 2 hours so as to carry out the desired reactions and, thus, to obtain composite resin material A.

Synthetic Example 2 of Composite Resin Material 200 parts of Hightec S-3121 (trade name of a water dispersion of an ethylene-based ionomer resin manufactured by Toho Kagaku Kogyo K.K., said dispersion containing 25% of solid components) was charged in a flask, followed by dripping 250 parts of Snowtex C (trade name of a colloidal silica manufactured by Nissan Kagaku Kogyo K.K., said colloidal silica containing 20% of solid components) into the flask over a period of about 10 minutes while sufficiently stirring Hightec S-3121 noted above at room temperature. After completion of the dripping, 2.4 parts of KBM 403 (trade name of γ-methacryloyloxy propyl trimethoxy silane manufactured by Shinetsu Kagaku Kogyo K.K.) was dripped into the flask, followed by heating the resultant reaction system to 85° C. The reaction system was maintained at 85° C. for 2 hours so as to carry out the desired reactions and, thus, to obtain composite resin material B.

Synthetic Example 3 of Composite Resin Material

A composite resin material b was obtained substantially as in Synthetic Example 2, except that the colloidal silica used in Synthetic Example 2 was not used in Synthetic Example 3.

Examples 1 to 22

A chromate treating layer was formed in a deposition amount of 10 to 200 g/m² on the surface of a plating layer of a pure zinc-plated steel sheet plated by the electroplating, the steel sheet having a thickness of 0.8 mm and a plating amount of 20 g/m². The chromate treating layer was formed by the reaction type chromate treatment or the dried-in-place type chromate treatment, followed by drying the coating.

After the chromate treatment, the surface of the steel sheet was coated with the composite resin material synthesized in each of the Synthetic Examples described above by a roll coater. In some of these Examples, the surface of the steel sheet was coated with a water dispersion prepared by dispersing the composite resin material in water together with a chromium compound and/or a lubricity imparting agent. After the coating step, the steel sheet was heated in a hot air blowing furnace to 100° C. so as to dry the coated water dispersion and, thus, to form a resin coating film. Table 1 shows the various conditions of these Examples 1 to 22.

Comparative Examples 1 to 11

A pure zinc-plated steel sheet plated by the electroplating as in Examples 1 to 22 was used in these Comparative Examples, too. In these Comparative Examples, a chromate treating layer was formed in a deposition amount of 30 mg/m$^2$ on the plated zinc layer of the steel sheet by the reaction type chromate treatment. Further, various composite resin materials including those which were not used in Examples 1 to 22 were used in these Comparative Examples so as to form a resin coating film as in Examples 1 to 22 under the conditions shown in Table 2. The chromate deposition amount shown in each of Tables 1 and 2 is denoted in terms of the metal chromium. Also, the amount of each of the chromium compound and the lubricity imparting agent shown in each of Tables 1 and 2 represents the percentage by weight based on the weight of the resin coating film.

It should be noted that resin A shown in each of Tables 1 and 2 represents the composite resin material prepared in Synthetic Example 1 of Composite Resin Material. Likewise, resins B and b represent the composite resin materials prepared in Synthetic Example 2 and 3 of Composite Resin Material, respectively. Table 2 also shows resins C to I, which represent the resins given below:

C: Ethylene-acrylic acid copolymer
D: Acrylic resin emulsion
E: Epoxy resin emulsion
F: Solvent type epoxy resin
G: Water soluble urethane resin
H: Vinyl acetate-acrylic acid copolymer
I: Ethylene-vinyl acetate copolymer The chromium compounds A to C shown in Tables 1 and 2 represent the compounds given below:

A: Strontium chromate
B: Anhydrous chromic acid
C: Lead chromate

The lubricity imparting agents A to C shown in Tables 1 and 2 represents the waxes given below:

A: Polyethylene wax
B: Polypropylene wax
C: Polybutene wax

Any of these lubricity imparting agents exhibits a melting point of at least 70° C.

The resistances to the blackening phenomenon and to the corrosion and the moldability of the zinc-plated steel sheets each having a resin coating film formed thereon, which were obtained in each of Examples 1 to 22 and Comparative Examples 1 to 11, were evaluated by the tests described below, with the results as shown in Tables 1 and 2.

(1) Resistance to Blackening Phenomenon:

Each of the test samples was left to stand for 24 hours under a humid atmosphere of high temperature, i.e., at a temperature of 80° C. and a relative humidity of 95%. The resistance to the blackening phenomenon was evaluated on the basis of the difference in L value specified in JIS (Japanese Industrial Standards) Z8730 6.3.2 (1980), which is a brightness index in a color difference formula by Hunter, between the value before the test and the value after the test. The blackening resistance thus evaluated is indicated in Tables 1 and 2 by marks specified as follows:

⊚: Difference in L value is less than 1
○: Difference in L value is 1 or more and less than 3
Δ: Difference in L value is 3 to 5
×: Difference in L value is more than 5

(2) Corrosion Resistance

A saline solution spraying test was applied on the basis of JIS Z2371. 240 hours after application of the saline solution, a white rust occurring ratio in terms of the surface area of the steel sheet was measured so as to evaluate the corrosion resistance. The corrosion resistance thus evaluated is indicated in Tables 1 and 2 by marks specified as follows:

⊚: Less than 10%
○: 10% or more and less than 30%
Δ: 30% or more and less than 50%
×: More than 50%

(3) Formability

The steel sheet was formed into a cylinder under the conditions of: punch diameter of 50 mm; blank diameter of 100 mm; die diameter of 51.91 mm; wrinkle suppressing force of 1 ton; and no coating oil. The outer appearance of the formed cylinder was visually inspected for evaluating the formability. The formability thus evaluated is indicated in Tables 1 and 2 by marks specified as follows:

⊚: No change
○: slight occurrence of scratches and discoloration
Δ: Remarkable occurrence of scratches and discoloration
×: occurrence of peeling of resin coating film accompanied by scratches, discoloration, etc.

TABLE 1

| Example | Chromate treating layer | | Resin coating film | | | | | | Evaluation | | |
| | Kind | Deposition amount (mg/m$^2$) | Kind of resin | Chromate compound | | Lubricity imparting agent | | Film thickness (μm) | Blackening resistance | Corrosion resistance | Formability |
| | | | | Kind | Content | Kind | Content | | | | |
| 1 | Reaction type | 30 | A | not contained | — | not contained | — | 1.0 | ⊚ | ○ | ○ |

TABLE 1-continued

| | Chromate treating layer | | Resin coating film | | | | | | Evaluation | | |
|---|---|---|---|---|---|---|---|---|---|---|---|
| Example | Kind | Deposition amount (mg/m²) | Kind of resin | Chromate compound Kind | Content | Lubricity imparting agent Kind | Content | Film thickness (μm) | Blackening resistance | Corrosion resistance | Formability |
| 2 | Reaction type | 30 | B | not contained | — | not contained | — | 1.0 | ⊙ | ○ | ○ |
| 3 | Dried-in-place type | 30 | A | not contained | — | not contained | — | 1.0 | ⊙ | ○ | ○ |
| 4 | Dried-in-place type | 10 | A | A | 5 | not contained | — | 1.0 | ⊙ | ○ | ○ |
| 5 | Dried-in-place type | 30 | A | A | 5 | not contained | — | 1.0 | ⊙ | ⊙ | ○ |
| 6 | Dried-in-place type | 100 | A | A | 5 | not contained | — | 1.0 | ⊙ | ⊙ | ○ |
| 7 | Dried-in-place type | 200 | A | A | 5 | not contained | — | 1.0 | ⊙ | ⊙ | ○ |
| 8 | Dried-in-place type | 30 | A | A | 5 | not contained | — | 0.2 | ○ | ○ | ○ |
| 9 | Dried-in-place type | 30 | A | A | 5 | not contained | — | 2.0 | ⊙ | ⊙ | ○ |
| 10 | Dried-in-place type | 30 | A | A | 10 | not contained | — | 1.0 | ⊙ | ⊙ | ○ |
| 11 | Dried-in-place type | 30 | A | A | 25 | not contained | — | 1.0 | ⊙ | ⊙ | ○ |
| 12 | Coating type | 30 | A | B | 2 | not contained | — | 1.0 | ⊙ | ⊙ | ○ |
| 13 | Coating type | 30 | A | C | 5 | not contained | — | 1.0 | ⊙ | ⊙ | ○ |
| 14 | Coating type | 30 | A | not contained | — | A | 5 | 1.0 | ⊙ | ○ | ⊙ |
| 15 | Coating type | 30 | A | not contained | — | A | 10 | 1.0 | ⊙ | ○ | ⊙ |
| 16 | Coating type | 30 | A | not contained | — | A | 15 | 1.0 | ⊙ | ○ | ⊙ |
| 17 | Coating type | 30 | A | not contained | — | B | 5 | 1.0 | ⊙ | ○ | ⊙ |
| 18 | Coating type | 30 | A | not contained | — | C | 5 | 1.0 | ⊙ | ○ | ⊙ |
| 19 | Coating type | 30 | A | A | 5 | A | 5 | 1.0 | ⊙ | ⊙ | ⊙ |
| 20 | Coating type | 30 | A | A | 5 | B | 5 | 5.0 | ⊙ | ⊙ | ⊙ |
| 21 | Coating type | 30 | A | A | 5 | C | 5 | 1.0 | ⊙ | ⊙ | ⊙ |
| 22 | Coating type | 30 | B | A | 25 | not contained | — | 1.0 | ⊙ | ○ | ○ |

TABLE 2

| | Chromate treating layer | | Resin coating film | | | | | | Evaluation | | |
|---|---|---|---|---|---|---|---|---|---|---|---|
| Comparative Example | Kind | Deposition amount (mg/m²) | Kind of resin | Chromate compound[2] Kind | Content | Lubricity imparting agent[3] Kind | Content | Film thickness (μm) | Blackening resistance | Corrosion resistance | Moldability |
| 1 | Reaction type | 30 | C | Not contained | — | Not contained | — | 1.0 | Δ | ○ | Δ |
| 2 | Reaction type | 30 | D | Not contained | — | Not contained | — | 1.0 | X | Δ | Δ |
| 3 | Reaction type | 30 | E | Not contained | — | Not contained | — | 1.0 | X | Δ | X |
| 4 | Reaction type | 30 | F | Not contained | — | Not contained | — | 1.0 | Δ | ○ | Δ |
| 5 | Reaction type | 30 | G | Not contained | — | Not contained | — | 1.0 | X | X | Δ |
| 6 | Reaction type | 30 | H | Not contained | — | Not contained | — | 1.0 | X | Δ | Δ |

TABLE 2-continued

| Comparative Example | Chromate treating layer Kind | Deposition amount (mg/m²) | Kind of resin | Resin coating film Chromate compound² Kind | Chromate compound² Content | Lubricity imparting agent³ Kind | Lubricity imparting agent³ Content | Film thickness (μm) | Evaluation Blackening resistance | Corrosion resistance | Moldability |
|---|---|---|---|---|---|---|---|---|---|---|---|
| 7 | Reaction type | 30 | I | Not contained | — | Not contained | — | 1.0 | X | Δ | Δ |
| 8 | Reaction type | 30 | Not contained | — | — | — | — | — | X | X | X |
| 9 | Reaction type | 30 | A | A | 5 | Not contained | — | 0.05 | Δ | Δ | Δ |
| 10 | Reaction type | 30 | C | A | 5 | Not contained | — | 1.0 | Δ | ⊙ | Δ |
| 11 | Reaction type | 30 | D | A | 5 | Not contained | — | 1.0 | X | ⊙ | Δ |

As apparent from Table 1, the steel sheet in any of Examples 1 to 22 exhibited a satisfactory corrosion resistance and an excellent resistance to the blackening phenomenon. Particularly, further improvement in corrosion resistance was recognized in Examples 5–7, 9–13 and 19–21, in which silica and a chromium compound were also added in forming the resin coating film. On the other hand, the steel sheet in each of Comparative Examples 1 to 11 was unsatisfactory, as apparent from Table 2. Incidentally, the steel sheet obtained in each of Examples 14 to 21, in which a lubricity imparting agent was also added in forming the resin coating film, exhibited an excellent lubricity.

Additional advantages and modifications will readily occur to those skilled in the art. Therefore, the invention in its broader aspects is not limited to the specific details, and representative steel sheet shown and described herein. Accordingly, various modifications may be made without departing from the spirit or scope of the general inventive concept as defined by the appended claims and their equivalents.

What is claimed is:

1. A zinc-plated steel sheet having a resin coating film formed on a surface thereof, comprising:
   (a) a base steel sheet plated with zinc or a zinc alloy to form a plating layer;
   (b) a chromate treating layer formed on the plating layer of said base sheet, said chromate treating layer being deposited in an amount of 1 to 200 mg/m² in terms of metal chromium; and
   (c) a resin coating film formed on the chromate treating layer in a thickness of 0.1 to 5 μm, said resin coating film comprising a composite resin material including (i) a resin composition and (ii) silica in an amount of at most 50% by weight, said resin composition containing a reaction product of an ethylene-based ionomer resin and a silane compound having a single silicon atom and 2 to 4 silyl ether bonds and/or a condensate of the silane compound.

2. The zinc-plated steel sheet according to claim 1, wherein said ionomer resin is obtained by neutralizing carboxyl groups of a copolymer having ethylene containing 3 to 20 mol % of α,β-ethylenically unsaturated carboxylic acid and α-β-ethylenically unsaturated carboxylic acid, said neutralization being carried out by an ion or an ionic compound.

3. The zinc-plated steel sheet according to claim 1, wherein the mixing ratio of said silica to said ethylene-based ionomer resin within said composite resin material is between 5/95 and 50/50.

4. The zinc-plated steel sheet according to claim 3, wherein the mixing ratio of said silica to said ethylene-based ionomer resin within said composite resin material is between 20/80 and 40/60.

5. The zinc-plated steel sheet according to claim 1, wherein said silane compound and/or a condensate thereof is in an amount of 0.5 to 15 parts by weight relative to 100 parts by weight of the sum of the solid components contained in said silica and said ethylene-based ionomer resin.

6. The zinc-plated steel sheet according to claim 5, wherein said silane compound and/or a condensate thereof is in an amount of 1 to 10 parts by weight relative to 100 parts by weight of the sum of the solid components contained in said silica and said ethylene-based ionomer resin.

7. The zinc-plated steel sheet according to claim 1, wherein the deposition amount of said chromate treating layer is between 10 and 100 mg/m² in terms of the metal chromium.

8. The zinc-plated steel sheet according to claim 1, wherein said resin coating film further contains not more than 30% by weight of a lubricity imparting agent having a melting point not lower than 70° C.

9. A zinc-plated steel sheet having a resin coating film formed on a surface thereof, comprising:
   (a) a base steel sheet plated with zinc or a zinc alloy to form a plating layer;
   (b) a chromate treating layer formed on the plating layer of said base sheet, said chromate treating layer being deposited in an amount of 1 to 200 mg/m² in terms of metal chromium; and
   (c) a resin coating film formed on the chromate treating layer in a thickness of 0.1 to 5 μm, said resin coating film comprising (i) a composite resin material including a resin composition and (ii) a chromium compound or both a chromium compound and silica, in an amount of at most 50% by weight,
   said resin composition containing a reaction product of an ethylene-based ionomer resin and a silane compound having a single silicon atom and 2 to 4 silyl ether bonds and/or a condensate of the silane compound.

10. The zinc-plated steel sheet according to claim 9, wherein said ionomer resin is obtained by neutralizing carboxyl groups of a copolymer having ethylene containing 3 to 20 mol % of α,β-ethylenically unsaturated carboxylic acid and α,β-ethylenically unsaturated carboxylic acid, said neutralization being carried out by an ion or an ionic compound.

11. The zinc-plated steel sheet according to claim 9, wherein the mixing ratio of said chromium compound or both said chromium compound and said silica to said ethylene-based ionomer resin within said composite resin material is between 5/95 and 50/50.

12. The zinc-plated steel sheet according to claim 11, wherein the mixing ratio of said chromium compound or both said chromium compound and said silica to said ethylene-based ionomer resin within said composite resin material falls within a range of between 20/80 and 40/60.

13. The zinc-plated steel sheet according to claim 9, wherein said silane compound and/or a condensate thereof is in an amount of 0.5 to 15 parts by weight relative to 100 parts by weight of the sum of the solid components contained in said chromium compound or both said chromium compound and said silica and said ethylene-based ionomer resin.

14. The zinc-plated steel sheet according to claim 13, wherein said silane compound and/or a condensate thereof is in an amount of 1 to 10 parts by weight relative to 100 parts by weight of the sum of the solid components contained in said chromium compound or both said chromium compound and said silica and said ethylene-based ionomer resin.

15. The zinc-plated steel sheet according to claim 9, wherein the deposition amount of said chromate treating layer is between 10 and 100 mg/m$^2$ in terms of the metal chromium.

16. The zinc-plated steel sheet according to claim 9, wherein said resin coating further contains not more than 30% by weight of a lubricity imparting agent having a melting point not lower than 70° C.

17. The zinc-plated steel sheet according to claim 4, wherein the resin has a molecular weight of 1,000 to 500,000.

18. The zinc-plated steel sheet according to claim 17, wherein the silane compound is selected from the group consisting of divinyl ethoxy silane, divinyl-β-methoxy ethoxy silane, di(γ-glycidoxy propyl) dimethoxy silane, methyl triethoxy silane, vinyl triethoxy silane, vinyl tris-β-methoxy ethoxy silane, γ-glycidoxy propyl trimethoxy silane, γ-mechacryloyloxy propyl trimethoxy silane, β-(3,4-epoxy cyclohexyl) ethyl trimethoxy silane, and γ-mercaptopropyl trimethoxy silane; the thickness of the resin coating being 0.3 to 3 μm; said silane compound and/or a condensate thereof is in an amount of 1 to 10 parts by weight relative to 100 parts by weight of the sum of said silica and said ethylene-based ionomer resin; the deposition amount of said chromate treating layer is between 10 and 100 mg/m$^2$ in terms of the metal chromium.

19. The zinc-plated steel sheet according to claim 12, wherein the resin has a molecular weight of 1,000 to 500,000.

20. The zinc-plated steel sheet according to claim 19, wherein the silane compound is selected from the group consisting of divinyl ethoxy silane, divinyl-β-methoxy ethoxy silane, di(γ-glycidoxy propyl)dimethoxy silane, methyl triethoxy silane, vinyl triethoxy silane, vinyl tris-β-methoxy ethoxy silane, γ-glycidoxy propyl trimethoxy silane, γ-mechacryloyloxy propyl trimethoxy silane, β-(3,4-epoxy cyclohexyl) ethyl trimethoxy silane, and γ-mercaptopropyl trimethoxy silane; the thickness of the resin coating being 0.3 to 3 μm; said silane compound and/or a condensate thereof is in an amount of 1 to 10 parts by weight relative to 100 parts by weight of the sum of said silica and said ethylene-based ionomer resin; the deposition amount of said chromate treating layer is between 10 and 100 mg/m$^2$ in terms of the metal chromium and the chromium compound is selected from the group consisting of stronium chromate, anhydrous chromic acid and lead chromate.

* * * * *